Patented June 17, 1947

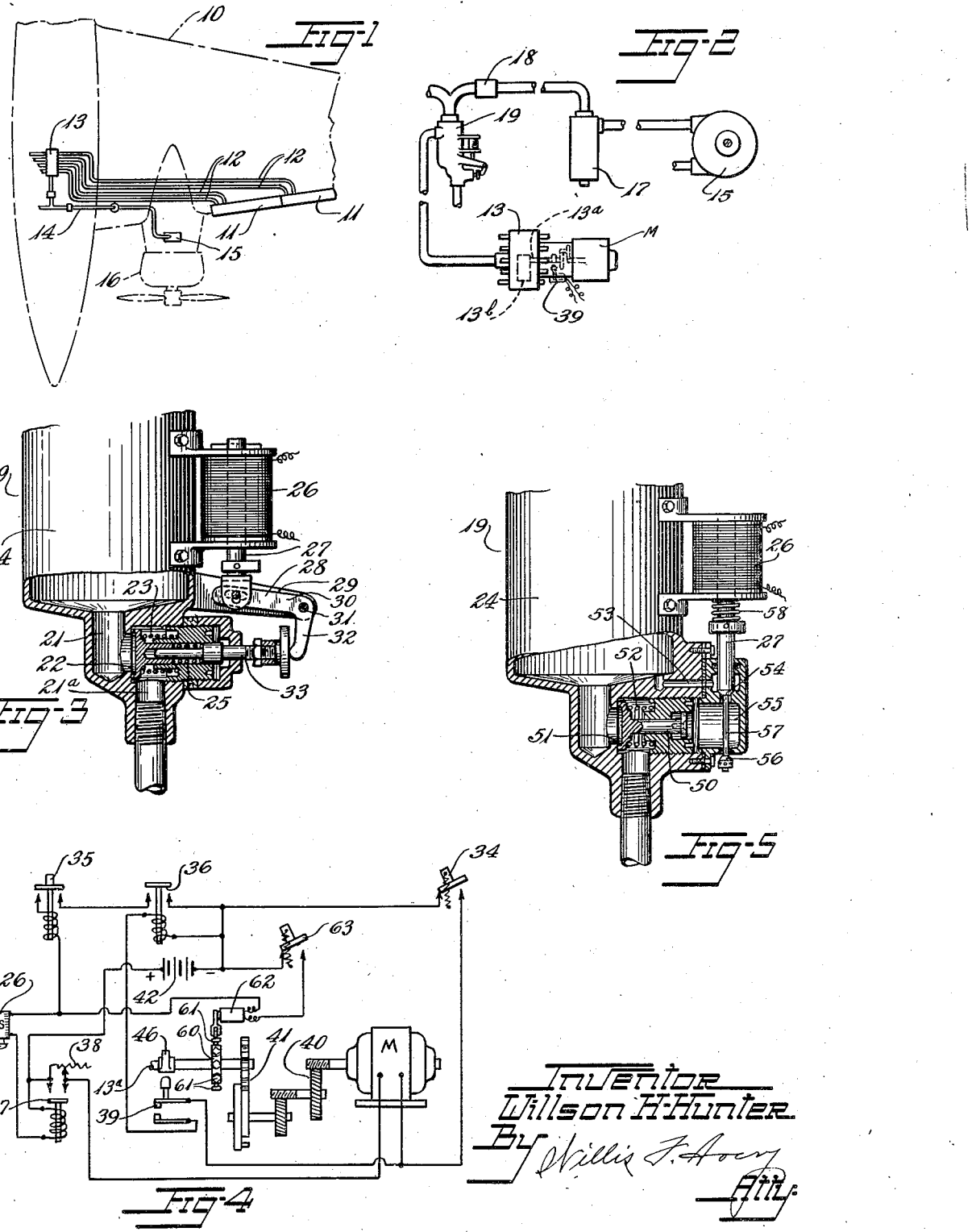

2,422,624

UNITED STATES PATENT OFFICE 2,422,624

INFLATION APPARATUS FOR ICE REMOVING MECHANISM

Willson H. Hunter, Akron, Ohio, assignor to The B. F. Goodrich Company, New York, N. Y., a corporation of New York Application October 14, 1943, Serial No. 506,157

9 Claims. (Cl. 244—134)

This invention relates to inflation apparatus of the type used, for example, in removing ice on wings, airfoils, and other surfaces of aircraft, and relates particularly to an apparatus for temporarily supplying increased inflating pressure to inflatable elements in cases where that is desired, as for the purpose of facilitating the removal of heavy accumulations of glaze ice.

The apparatus is preferably controlled by an easily accessible switching means and is so constructed that the new higher air pressure is automatically maintained until all units in the inflation system have been inflated under such higher pressure at least once. Then the system returns to its operation on the lower normal pressure. Provision is made also for automatically increasing the inflation pressure for certain units each cycle under control of the operator for optional use.

The chief objects of the present invention are to provide for applying temporarily an increased air pressure over normal operation to inflatable units to take care of extreme icing conditions, to provide for applying this additional pressure over a longer than normal inflating period, to provide for continuing the application of the additional pressure until all the inflatable units have been inflated at least once, and to provide easily accessible switching means for operating the auxiliary apparatus. A further object is to provide for regular inflation of selected units at the higher pressure.

These and further objects will become apparent from the following description, reference being had to the enclosed drawings. Of the drawings:

Fig. 1 is a plan view of a section of an airplane, shown in broken lines, with inflation units mounted upon the wing and with a piping system for controlling the inflation and deflation of the units, the construction being in accordance with and embodying the invention.

Fig. 2 is a diagrammatic view of piping arrangement between the supply pump and distributor mechanism.

Fig. 3 is an elevation, partially broken away and in section, of one end of the air accumulator and pressure regulator.

Fig. 4 is a schematic wiring diagram of apparatus embodying the invention.

Fig. 5 is a view similar to Fig. 3 but showing an alternate construction of the pressure regulator.

Referring to Fig. 1, there is shown a section of an airplane wing 10 with a pair of inflatable ice removing shoes 11, 11 positioned on the leading edge. From each of these shoes 11, 11 a pair of air pipes 12, 12 leads to a distributor 13 which is connected by another pipe 14 to an air pump 15 mounted on and operated by one of the airplane motors 16. In the piping system (Fig. 2) leading from the air pump 15 to the distributor 13 there is arranged an oil separator 17, a check valve 18, and an air accumulator 19 leading to the distributor 13. The air accumulator 19 has built into it a relief valve for limiting the air pressure in the system. This relief valve comprises a port 21 leading to the atmosphere through passage 21a, normally closed by a valve 22 backed by an adjustable spring 23. The spring 23 may be adjusted to permit opening of the valve 22 at any desired pressure, thereby maintaining a substantially constant air pressure in the system.

It has been found that aircraft in flight sometimes encounter conditions of extremely heavy ice formation. It is the purpose of this invention to provide additional apparatus of an auxiliary nature to provide for additional pressure in such cases. One embodiment of the invention is shown in Figs. 1 to 4 of the drawings.

In the embodiment of Fig. 3 in addition to the aforementioned first spring 23, there is provided a second spring 25 to increase pressure on the valve 22 so that the valve 22 will only open at a new higher pressure, according to its setting. This second spring 25 is not normally in restraining position and is only brought into position when electrical connections are made to effect this. The second spring 25 is brought into restraining position when a solenoid 26 mounted on the outside of the air chamber 24 is operated. The solenoid 26, when its circuit is closed, pulls its armature 27 upward (Fig. 3) thereby operating a bell crank 28 arranged on a bracket 29 mounted just below the solenoid 26. When the solenoid armature 27 moves upwardly it pulls the horizontal arm 30 of the bell crank 28 up, pivoting it on the fulcrum 31, and forces the downwardly extending bell crank arm 32 to the left. This moves a plunger 33 in the valve structure to the left and brings the second spring 25 into operation to increase the pressure on the valve 22, normally provided by the first spring 23. This increased pressure is maintained until the solenoid circuit is broken, when the parts are turned to the position of Fig. 3 and the added pressure is released.

In the circuit of solenoid 26 there is provided a pilot's master toggle switch 34 (Fig. 4), a control switch 35 which is used when it is desired that additional air pressure be provided, a first relay contact 36, a second relay contact 37, a resistance 38, and a cam operated switch 39.

A worm gear reducer 40 and a Geneva-stop mechanism 41 driven by a motor M from a battery or other power source 42 rotate a shaft 13a in step by step movement to step around the rotor 13b (Fig. 2) of the distributor 13 to inflate and deflate the units 11, 11 in cycles in a manner such as is disclosed more in detail in my Patent No. 2,327,046, issued August 17, 1943.

When the apparatus is wired as shown in Fig. 4, and with the control switch 34 in open position, the motor M is off, the first relay 36 and the emergency switch 35 are in open position, and the second relay 37 is in closed position shunting the resistance 38 out of the circuit.

To operate the ice removal apparatus at normal air pressure the control switch 34 is closed. This starts the motor M and closes the first relay 36 and the microswitch 39. The motor M operates the distributor 13 that regulates the air supply to the inflatable tubes of the apparatus. The motor M is also connected through a worm gear reducer 40 to the Geneva-stop mechanism 41. The Geneva-stop mechanism 41 comprises a notched wheel 43 and a second wheel 44 having a pin 45 adapted to engage the notches. This second wheel is conncted to the gear reducer 40 while the notched wheel 43 operates a cam mechanism 46 which acts on a bearing 47 to open and close the microswitch 39. Therefore, the control switch 34 starts the ice removal apparatus at normal low pressure and closes the first relay 36 and microswitch 39. The second relay 37 remains in its normally closed position to shunt the resistance 38 out of the motor circuit.

With the master switch 34 on, the ice removal apparatus continues to operate at its normal pressure. When the operator closes switch 35, this energizes the circuit to solenoid 26 causing it to come into operation and build up pressure in the system. Closing of the switch 35 also causes the second relay 37 to open and place the resistance 38 in the motor circuit. This added resistance slows the motor down so that the higher pressure will be maintained for a longer period of time than the operation under the normal lower pressure.

The wiring arrangement of Fig. 4 is such that when the switch 35 is closed this switch will continue to be held in closed position for one complete revolution of the distributor rotor 13b, thereby giving each inflatable tube one inflation at the increased pressure even though the operator release switch 35 before this cycle is completed. As soon as this one complete revolution is completed the circuit is broken, the switch 35 opens, and the ice removal apparatus continues to operate at its normal lower pressure. The breaking of the circuit of the switch 35 is accomplished through the cam operated switch 39 which is held in closed position by the cam 46 on the shaft 13a and opens when there has been one complete revolution of the distributor rotor 13b. As the switch 39 is in series with the solenoid of relay 36, the latter opens upon the opening of switch 39 and this opens the circuit to the solenoid 26. Therefore, the pilot-operator has only to close the switch 35, holding it closed only temporarily, and it is automatically held closed for one complete revolution, thereby inflating all the tubes once at the new high pressure. And as soon as this one revolution has been completed the cam operated switch 39 breaks the circuit and opens the relay 36 and switch 35 so that the system returns to its normally low pressure operation.

In the embodiment of Fig. 5, the valve has a piston 50 held against a valve seat 51 in the air outlet passage by a spring 52 that holds the valve closed at normal operating pressure. There is provided a passageway 53 leading from the air chamber 24 to the rear of the piston 50 and this passageway is held normally closed by a second valve 54 attached to the armature 27 of a solenoid. The passageway 53 connects to a chamber 55 behind the piston 50, which piston at this end has an area considerably smaller than the area at the opposite end. Then when the electrical circuit to the solenoid is closed, and the solenoid is energized, the armature 27 moves up, opening the second valve 54, and permitting air pressure from the air cylinder to enter the small chamber 55 behind the piston. This air pressure, operating on the head of the piston 50, provides an added force to hold the relief valve closed and thus build up pressure in the air chamber and the entire system. When the solenoid circuit is then broken the armature 27 is forced down by an armature spring 58, closing the second valve 54 in the passageway 53, and returning the system to normal operation on the lower pressure. In the solenoid-pneumatic arrangement described there is also provided a third valve 56 at the bottom of the small chamber 55. This is connected to a small rod 57 extending beneath the solenoid armature 27 and is so constructed that when the solenoid circuit is broken and the armature is forced down by means of the armature spring 58 the third valve 56 is opened to permit the air in the small chamber 55 to escape.

In some cases it may be desired to operate certain of the inflatable units at the higher pressure regularly in the cyclic operation thereof while the remaining units operate at the lower pressure. For this purpose a cam wheel 60 may be mounted upon the shaft 13a to rotate directly with the rotor 13b of the distributor. The cam wheel has cam heads 61, 61 about its periphery in a spacing and number corresponding to the port positions of the rotor 13b. Each cam head 61 is threadedly mounted in the wheel for adjustment in the radial direction. A switch 62 is mounted in a position to be operated by the cam heads 61, 61 in their outer adjusted positions, so that each inflatable unit can receive the higher inflation pressure or not according to the adjustment of the cam head controlling it. The swtch 62 is wired in series with a control toggle switch 63 between the power source 42 and the solenoid 26, preferably with the relay 37 also in series so that when the higher pressure is applied the resistance 38 will be cut in to slow the motor during the application of such higher pressure.

The switches by means of which the auxiliary apparatus is operated may be placed in the pilot's compartment or any other convenient position in the aircraft.

Variations may be made without departing from the scope of the invention as it is defined in the following claims.

I claim:

1. Apparatus for supplying air under controlled pressure to an inflatable unit, said apparatus comprising means for supplying air under pressure to said unit, means for regulating the pressure of the air so supplied at a predetermined pressure, and means to control the regulating means for temporarily raising the pressure to a higher value, the control means including manually releasable timing means and means responsive to operation of said timing means and controlling said regulating means to return the pressure to the lower value.

2. Apparatus for supplying air under controlled pressure to a plurality of inflatable units, said apparatus comprising distributor means for supplying air under pressure in turn to the inflatable units, means for controlling the pressure of the air so supplied comprising pressure relief means operable at a predetermined pressure, means operable in conjunction with the pressure relief means for raising the pressure to a higher value, and means responsive to operation of said distributor means for maintaining said higher pressure through a complete inflation cycle of said distributor means.

3. Apparatus for supplying air under pressure to a plurality of inflatable units, said apparatus comprising distributor means for supplying air under pressure in turn to the inflatable units, means for controlling the pressure of the air so supplied comprising pressure relief means operable at a predetermined normal pressure, means operable in conjunction with the pressure release means for raising the pressure to a higher value, means responsive to operation of said distributor means for maintaining said higher pressure through a complete inflation cycle of said distributor means and means responsive to operation of said distributor means for returning the pressure to its normal value after said inflation cycle.

4. Apparatus for supplying air under pressure to a plurality of inflatable units, said apparatus comprising distributor means for supplying air under pressure from a single supply main in turn to the inflatable units, and means responsive to operation of said distributor means for modifying the pressure in said main when said main is connected to one of said units as compared to the pressure in said main when said main is connected to other of said units.

5. Apparatus for controlling a supply of air under pressure to an inflatable unit, said apparatus comprising means for continuously supplying air under pressure to inflate said unit, means for intermittently inflating said unit from the supply means, means for limiting the pressure of air regularly supplied to said unit for successive inflations, means for increasing the pressure of the supply of air from the pressure-limiting means to said unit during an inflation thereof in a series of successive inflations, said last named means being normally dormant, and manually controlled means for setting said increased pressure means in operation.

6. Apparatus for controlling a supply of air under pressure to a series of inflatable units, said apparatus comprising means for continuously supplying air under pressure to inflate said units, distributor means for inflating said units intermittently in succession from the supply means, means for regulating the pressure of air supplied to said distributor means to provide uniform pressure, means associated with said regulating means for increasing the pressure over the regulated pressure, manually controlled means for setting said means for increasing pressure in operation, and means responsive to movement of said distributor means for returning the pressure to the lower value.

7. Apparatus for controlling a supply of air under pressure to a series of inflatable units, said apparatus comprising means for continuously supplying air under pressure to inflate said units, distributor means for inflating said units intermittently in succession from the supply means, means for regulating the pressure of air supplied to said distributor means to provide uniform pressure, means associated with said regulating means for increasing the pressure over the regulated pressure, manually controlled means for setting said means for increasing pressure in operation, said manually controlled means including means actuating said regulating means to return the pressure to the lower value.

8. Apparatus for controlling a supply of air under pressure to a series of inflatable units, said apparatus comprising means for continuously supplying air under pressure to inflate said units, distributor means for inflating said units intermittently in succession from the supply means, means for regulating the pressure of air supplied to said distributor means to provide uniform pressure, means associated with said regulating means for increasing the pressure over the regulated pressure, manually controlled means for setting said means for increasing pressure in operation, said manually controlled means including means actuating said distributor means for increasing the length of the cycle of inflation and means responsive to operation of said distributor means for returning the apparatus to its normal inflation cycle.

9. Apparatus for controlling a supply of air under pressure to a series of inflatable units, said apparatus comprising means for continuously supplying air under pressure to inflate said units, distributor means for inflating said units intermittently in succession from the supply means, means for regulating the pressure of air supplied to said distributor means to provide uniform pressure, means associated with said regulating means for increasing the pressure over the regulated pressure, manually controlled means for setting said means for increasing pressure in operation, said manually controlled means including means operable upon said distributor means for increasing the length of the cycle of inflation.

WILLSON H. HUNTER.

REFERENCES CITED

The following references are of record in the file of this patent:

UNITED STATES PATENTS

| Number | Name | Date |
|---|---|---|
| 1,990,866 | Gregg | Feb. 12, 1935 |
| 2,038,039 | Gregg | Apr. 21, 1936 |
| 2,327,034 | Geer | Aug. 17, 1943 |
| 2,251,430 | Taylor | Aug. 5, 1941 |